Oct. 28, 1958　　E. S. PRICHARD ET AL　　2,858,143
FIFTH-WHEEL CONSTRUCTION
Filed Sept. 26, 1955　　　　　　　　　　2 Sheets-Sheet 1
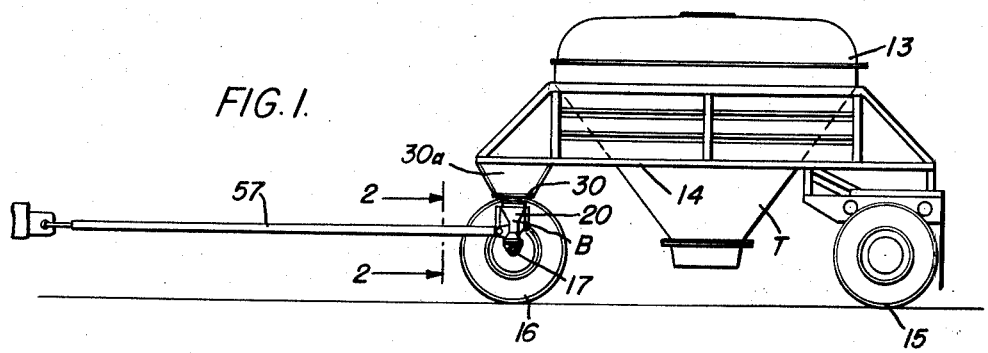
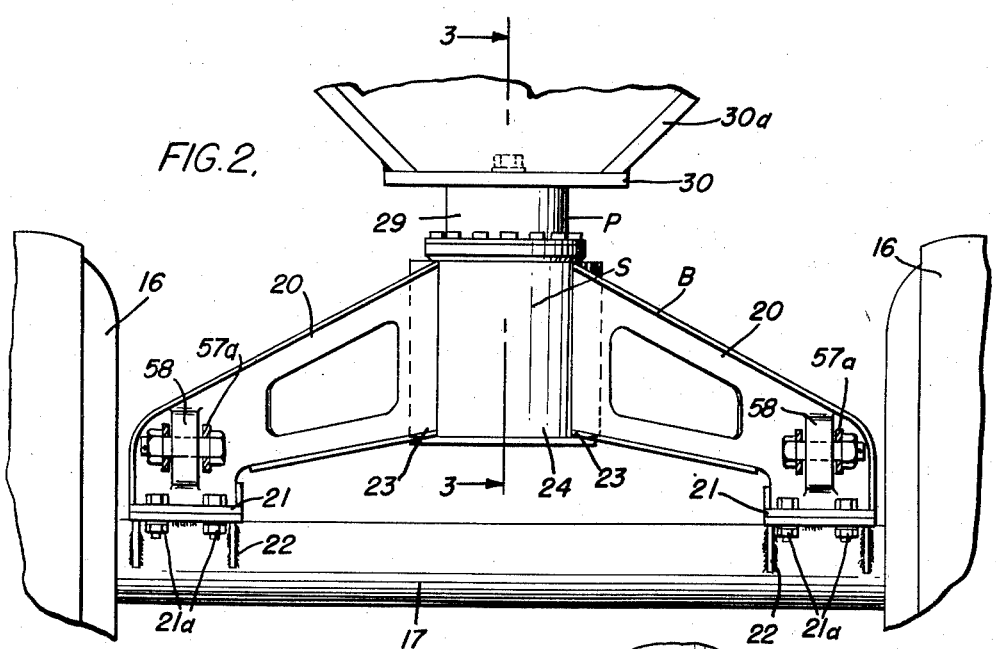
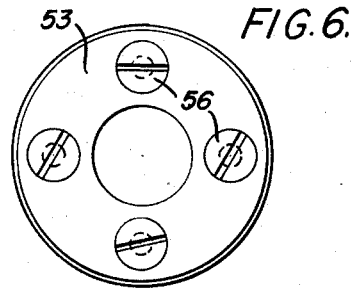
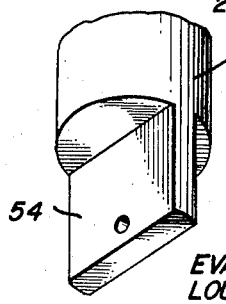
EVAN S. PRICHARD
LOUIS M. BALLARD
INVENTORS.
BY
*Attorney*

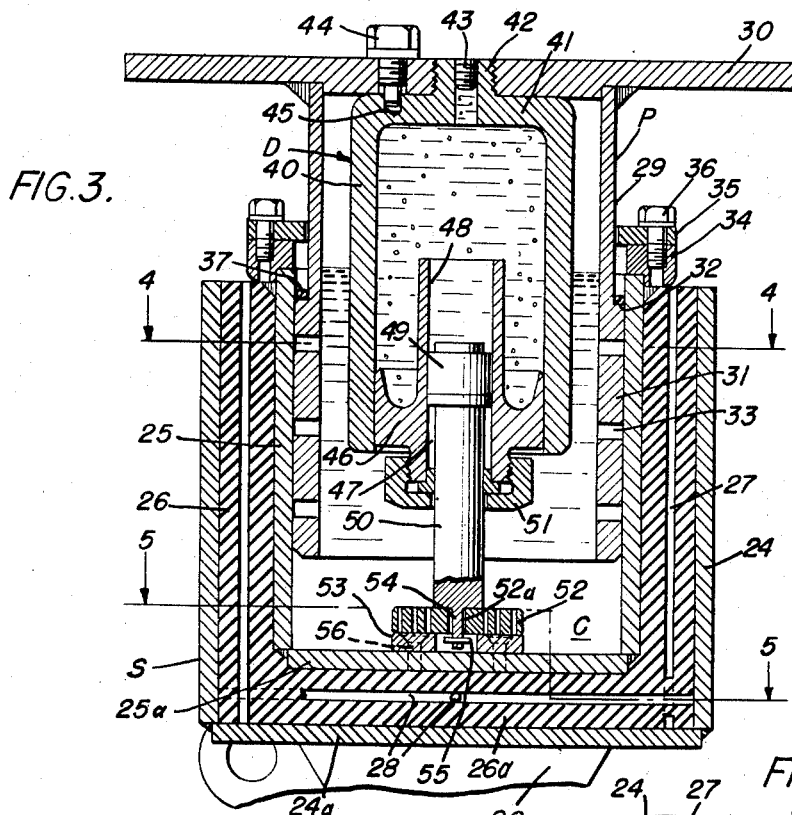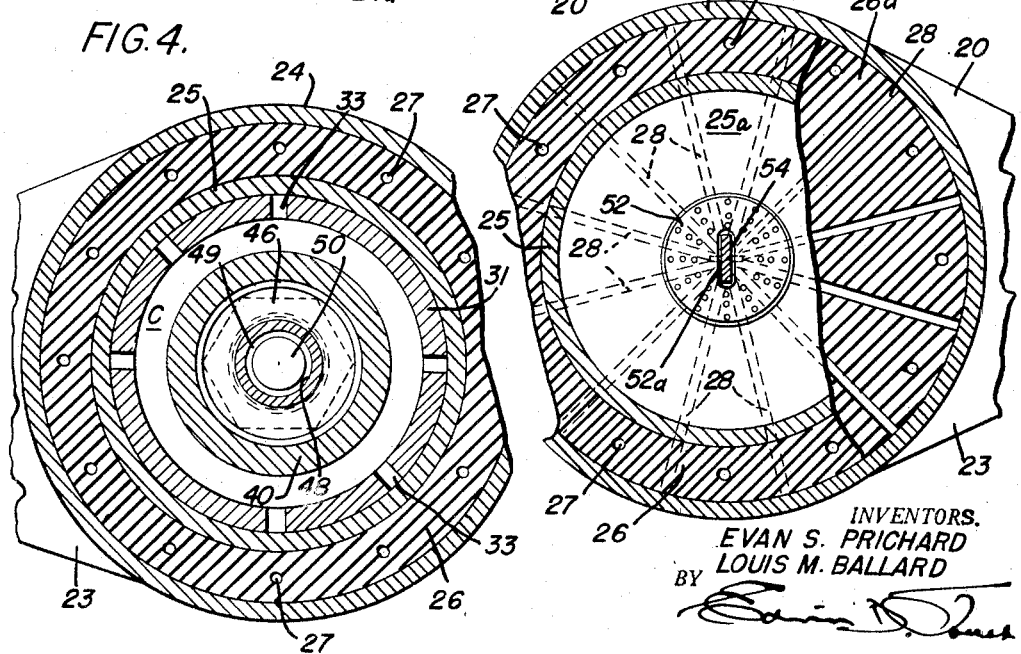

United States Patent Office 2,858,143
Patented Oct. 28, 1958

2,858,143

FIFTH-WHEEL CONSTRUCTION

Evan S. Prichard, La Canada, and Louis M. Ballard, Arcadia, Calif., assignors to Cook Bros. Equipment Co., Los Angeles, Calif., a corporation of California Application September 26, 1955, Serial No. 536,623

10 Claims. (Cl. 280—131)

Our invention relates to fifth-wheel construction as used on trucks and more particularly trailers, and it has for a purpose the provision of a fifth-wheel construction which eliminates the use of leaf springs between the front axle and the bolster and the relatively rotatable disks that are used in present fifth-wheel construction, and whereby are attained those highly desirable advantages of greatly reducing the weight of the construction as a whole, reducing the frictional resistance offered to turning of its parts, and more effectively absorbing road shocks and vibrations in their transmission to the trailer frame from the front axle, whether produced by bodily movement of such axle vertically or tilting movement thereof vertically resultant of the wheels rolling over uneven ground.

It is also a purpose of our invention to provide a fifth-wheel construction, the parts of which are so constructed and associated with each other as to prevent play developing therein resultant of wear, such as to require adjustment thereof to maintain the fifth wheel in effective operation.

A further purpose of our invention is the provision in a fifth-wheel construction of this character, of a spindle and socket structure that provides an oil reservoir for constant and thorough lubrication of the bearing surfaces of all parts thereof to minimize friction and wear.

We will describe only one form of fifth-wheel construction embodying our invention in association with a trailer, and will then point out the novel features thereof in claims.

In the accompanying drawings:

Fig. 1 is a view showing a trailer in side elevation and with the front axle thereof in vertical section, and having applied thereto one form of fifth-wheel construction embodying our invention.

Fig. 2 is an enlarged vertical sectional view taken on the line 2—2 of Fig. 1.

Fig. 3 is an enlarged vertical sectional view taken on the line 3—3 of Fig. 2.

Fig. 4 is a horizontal sectional view taken on the line 4—4 of Fig. 3.

Fig. 5 is a horizontal sectional view taken on the line 5—5 of Fig. 3.

Fig. 6 is an enlarged detail plan view of the bearing plate embodied in the fifth-wheel construction.

Fig. 7 is an enlarged fragmentary perspective view of the lower end of the piston rod of our invention.

Referring more particularly to the drawings, in Fig. 1 is shown a trailer designated generally at T which is of conventional construction with the exception of the fifth wheel of our invention, and it is shown as comprising a body 13 supported on a frame 14, the latter being supported at its rear end on wheels 15, and at its forward end by wheels 16 mounted on the ends of an axle 17.

The fifth-wheel construction of our invention comprises a bolster B made up of two arms or beams 20 which at their lower and down-turned ends are formed with plates 21 secured by bolts 21a to brackets 22 welded to the axle 17. The upper ends of the arms 20 are of arcuate form, as indicated at 23, shown best in Figs. 4 and 5, and are welded to the outer cylindrical member 24 of a socket structure designated generally at S. This structure also includes an inner cylindrical member 25, and between the members is a cupped shaped body 26 of resilient rubber. The members 24 and 25 have bottom walls 24a and 25a welded to the cylindrical walls so that the two members are of cupped form, with their upper ends open.

The rubber body 26 has a bottom wall 26a interposed between the bottom walls 24a and 25a of the members 24 and 25. This body is completely bonded to the confronting walls of such members, and to afford displacement for the purpose of allowing ready compressibility of the body in its function to provide a resilient medium between the members to absorb oscillating movement of the axle 17 about a horizontal axis as transmitted from the outer member 24 to the inner member 25, such body is formed in the cylindrical portion thereof with a series of vertical openings 27.

Likewise to afford displacement and hence ready compressibility of the bottom wall 26a, it is formed with a plurality of radial openings 28 which communicate with each other at the center of the wall.

Thus a resilient medium is provide between the bottom walls 24a and 25a to yieldingly resist movement of the wall 24a upwardly and laterally in relation to the wall 25a.

The fifth-wheel construction also includes a spindle member P which is of tubular form, and has an upper portion 29 welded at its upper end to a plate 30 that is welded to a part 30a of the forward end of the trailer frame 14 that depends therefrom. The spindle member P also includes a lower portion 31 of increased thickness as compared to the upper portion 29, so as to provide an annular shoulder 32 at the junction of the two. The portion 31 is formed with a series of radial ports 33, the purpose of which will be described hereinafter.

The spindle member P is slidably and rotatably fitted in the inner member 25 of the socket S, and it is confined against vertical displacement therefrom by a metal collar 34 welded to the upper end of the member 25 and upon which a ring 35 is secured by means of bolts 36. The ring 35 overhangs the inner periphery of the collar 34 so as to coact with the shoulder 32 in preventing upward displacement of the member P or downward displacement of the member 25. To provide an oil seal between the ring 35 and the member P a sealing ring 37 seats on the shoulder 32.

Manifestly, this construction and arrangement of the spindle and socket provides between the two a chamber C which, although variable in size by reason of axial movements of the spindle and socket relatively, is at all times completely closed against the escape therefrom of the lubricating oil which it is adapted to receive, as well as to prevent the ingress of dirt thereinto.

The fifth-wheel construction also includes a hydraulic spring device designated generally at D, and which comprises a cylinder 40 closed at its upper end by a wall 41 provided at its center with a nipple 42 through which a gasified oil can be supplied to the cylinder, and which nipple is normally closed by a screw plug 43. The nipple 42 is screw threaded in the plate 30, and to lock the nipple against unscrewing therefrom a lock bolt 44 extends through the plate 30 and into a socket 45 in the wall 41.

The device D also includes a head 46 which has a press fit in the lower end of the cylinder 40 to permanently close the same. This head is provided with an axial opening 47, and on its inner side with a cylinder 48 opening into the cylinder 40, and in which a piston 49 is movable. The piston is provided with a rod 50 which extends downwardly through a stuffing box structure 51, and its lower end carries a bearing plate 52 which normally seats on a second bearing plate 53.

The plate 52 is secured to the lower end of the piston 49 by forming a flat extension 54 on the piston which projects through a slot 52a in the center of the plate, and is secured against displacement therefrom by a cross pin 55. The lower plate 53 is fixed to the bottom wall 25a of the member 25 by screws 56. It will be noted that the plate 52 is provided with a multiplicity of openings 52a the purpose of which will be described hereinafter.

As will be seen in Figs. 1 and 2, the trailer is provided with a draft bar 57 by which it can be coupled to the rear end of a truck (not shown) for hauling the trailer. The bar 57 has at its rear end two divergent portions 57a each of which is bifurcated and pivotally connected to the beams 20 by bolts extending therethrough and through ears 58 formed on the beams.

By means of the ports 33 oil is free to pass between the member 25 and the lower spindle portion 31, and by the provision of the openings 52a oil can reach the confronting surfaces of the plate 52 and 53 so that the two can turn relatively with minimum friction.

To condition the fifth wheel construction for use, the chamber C is adapted to be partly filled with a suitable oil as illustrated in Fig. 3, for constant and thorough lubrication not only of the plates 52 and 53, but of the bearing surfaces of the member 25, and the spindle member P to at all times insure free reciprocation and oscillation of the two relatively. Further, cylinders 40 and 48 are, through the nipple 42, adapted to be filled with a suitable lubricating oil and a suitable gas in such proportions that a fluid body is formed which provides both compressibility and lubricity.

With the fifth-wheel construction so conditioned for use, its operation as applied to the trailer is as follows:

Upward movement of the axle 17 bodily as a result of upward movement simultaneously of the wheels 16 such as occurs when traveling over uneven ground, imparts vertical thrust to the socket S causing it to telescope upwardly on the spindle P. This movement of the socket is yieldingly resisted by the spring function of the device D. As the socket moves upwardly the bearing plate 53 in its movement therewith acts through the plate 52 to force the piston 49 upwardly in the cylinder 48 thereby compressing the fluid in both cylinders 40 and 48. This results in the fluid so yieldingly resisting movement of the piston as to prevent the transmission of shock and vibration to the trailer frame.

Since the socket is, in addition, oscillatable on the spindle, it can respond to steering movements of the front trailer wheels, the shock absorbing function of the device D being effective in any position of the axle circumferentially with respect to the spindle.

In the event the axle 17 is tilted from end to end in either direction because one front wheel or the other is lifted in respect to the other as when rolling over uneven ground, the socket S is subjected to tilting movements in relation to the spindle P. By virtue of the resilient rubber body 26 as interposed between the member 25 and the spindle S, such tilting movements, regardless of the circumferential position of the axle at the time its tilting occurs, are resisted by compression of the rubber between the members 24 and 25 since the member 25 cannot move laterally with relation to the spindle member. As a consequence the rubber body serves to absorb shocks and vibrations stemming from such axle tilting in their transmission to the trailer frame.

A fifth wheel constructed in accordance with our invention not only provides the shock and vibration absorbing properties and the lubricating advantages above described, but in eliminating the use of springs and other heavy parts of prior fifth-wheel constructions, the weight of the construction as a whole is greatly reduced to, in turn, greatly reduce the overall weight of the trailer.

Although we have herein shown and described only one form of fifth-wheel construction embodying our invention, it is to be understood that various changes and modifications may be made therein without departing from the spirit of the invention and the spirit and scope of the appended claims.

What we claim is:

1. A fifth-wheel construction, including: a socket comprising inner and outer members of cup form, and a compressible body between said members for yieldingly resisting lateral movements of said members relatively; a spindle telescoping in the inner member for both axial and circumferential movements therein; and a device for yieldingly resisting axial movements of the socket and spindle relatively, comprising a cylinder within and fixed to one end of the spindle; a gasified liquid contained within the cylinder which provides both compressibility and lubricity, and a piston movable in the cylinder and having a rod fixed thereto and projecting from the cylinder to have contact with the bottom of the inner member.

2. A fifth-wheel construction, including: a socket comprising inner and outer members of cup form, and a compressible body between said members for yieldingly resisting lateral movements of said members relatively; a spindle telescoping in the inner member for both axial and circumferential movements therein and providing between the two a closed chamber in which oil is adapted to be confined for lubricating the bearing surfaces of the two; and a device for yieldingly resisting axial movements of the socket and spindle relatively, comprising a cylinder within and fixed to one end of the spindle, the cylinder adapted to contain a gasified liquid which provides both compressibility and lubricity, and a piston movable in the cylinder and having a rod fixed thereto and projecting from the cylinder to have contact with the bottom of the inner member.

3. A fifth-wheel construction as embodied in claim 1, wherein said body is constructed of resilient rubber and provided with openings therein to increase the compressibility thereof.

4. A fifth-wheel construction as embodied in claim 1, wherein said body is of cup form, constructed of resilient rubber, bonded to the confronting walls of said members, and provided with openings therein to increase the compressibility thereof.

5. A fifth-wheel construction as embodied in claim 1, wherein said body is of cup form and constructed of resilient rubber, and bonded to the confronting walls of said members, the cylindrical portion of said body being formed with openings longitudinally therethrough, and the flat portion of said body being formed with openings extending radially from the center thereof.

6. A fifth-wheel construction, including: a socket comprising inner and outer members of cup form, and a compressible body between said members for yieldingly resisting lateral movements of said members relatively; a spindle telescoping in the inner member for both axial and circumferential movements therein and providing between the two a closed chamber in which oil is adapted to be confined for lubricating the bearing surfaces of the two; and a device for yieldingly resisting axial movements of the socket and spindle relatively, comprising a first cylinder within and fixed to one end of the spindle; a second cylinder fixed and wholly contained within the first cylinder and communicating at one end therewith; a compressible fluid contained in both of said cylinders; and a piston movable axially in the second cylinder and having a rod fixed thereto and projecting from the second cylinder to engage the closed end of said inner member, whereby when said socket and spindle are moved axially relatively the piston will operate to compress said fluid.

7. A fifth-wheel construction as embodied in claim 6, wherein said body is constructed of resilient rubber and provided with openings therein to increase the compressibility thereof.

8. A fifth-wheel construction as embodied in claim 6, wherein said body is of cup form, constructed of resilient rubber, bonded to the confronting walls of said members, and provided with openings therein to increase the compressibility thereof.

9. A fifth-wheel construction, including: a socket of cup form adapted to contain a lubricant; a spindle of tubular form having a telescopic fit within the socket; a member closing the upper end of the spindle; a cylinder fixed at one end to the member and disposed concentrically within the spindle and spaced therefrom, the spindle having openings therein leading from the inner side to the outer side thereof so that the lubricant in the socket can pass to the confronting surfaces of the socket and spindle; a compressible lubricant in the cylinder; a piston movable in the cylinder; and a rod fixed to the piston and projecting from the cylinder so as to have contact with the closed end of the socket.

10. A fifth-wheel construction, including: a socket of cup form adapted to contain a lubricant; a bearing member fixed centrally in the bottom of the member; a spindle of tubular form telescoping within the socket for both axial and circumferential movements therein; a member closing the upper end of the spindle; a first cylinder fixed at its upper end to the member and disposed concentrically within the spindle; a second cylinder fixed and wholly contained within the first cylinder and communicating at its upper end therewith; a compressible fluid contained within both of said cylinders; a piston movable axially in the second cylinder and having a rod fixed thereto and projecting from the lower end of the second cylinder; and a perforated bearing member fixed to the lower end of the piston and rotatably engaging the first-mentioned bearing member.

References Cited in the file of this patent
UNITED STATES PATENTS

| | | |
|---|---|---|
| 2,250,134 | Pointer | July 22, 1941 |
| 2,751,216 | Taylor | June 19, 1956 |